United States Patent
Nukisato et al.

(10) Patent No.: US 7,298,095 B2
(45) Date of Patent: Nov. 20, 2007

(54) DISCHARGE LAMP BALLAST APPARATUS

(75) Inventors: Yasuhiro Nukisato, Tokyo (JP);
Takashi Ohsawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/568,534

(22) PCT Filed: May 25, 2005

(86) PCT No.: PCT/JP2005/009555

§ 371 (c)(1),
(2), (4) Date: Feb. 17, 2006

(87) PCT Pub. No.: WO2006/011288

PCT Pub. Date: Feb. 2, 2006

(65) Prior Publication Data

US 2006/0261748 A1    Nov. 23, 2006

(30) Foreign Application Priority Data

Jul. 28, 2004    (JP) .............................. 2004-220400

(51) Int. Cl.
*G05F 1/00* (2006.01)

(52) U.S. Cl. ...................................... 315/291; 315/307

(58) Field of Classification Search ............ 315/209 R, 315/224–226, 276–277, 291, 307–308, 246
See application file for complete search history.

(56) References Cited

U.S. PATENT DOCUMENTS 5,923,129 A * 7/1999 Henry ......................... 315/307
6,198,234 B1 * 3/2001 Henry ......................... 315/291
6,281,642 B1 * 8/2001 Konishi et al. .............. 315/308
6,392,364 B1   5/2002 Yamamoto et al. ......... 315/291
6,504,323 B2 * 1/2003 Yuda et al. .................. 315/307
6,570,344 B2 * 5/2003 Lin ............................. 315/224
2004/0113567 A1 * 6/2004 Yamauchi et al. .......... 315/291

FOREIGN PATENT DOCUMENTS

| JP | 6-188078 A | 7/1994 |
| JP | 7-169585 A | 7/1995 |
| JP | 8-45675 A | 2/1996 |
| JP | 9-223590 A | 8/1997 |
| JP | 2001-43986 A | 2/2001 |
| JP | 2001-43989 A | 2/2001 |
| JP | 2002-110384 A | 4/2002 |
| JP | 2003-323992 A | 11/2003 |

* cited by examiner

*Primary Examiner*—Haissa Philogene
*Assistant Examiner*—Tung X Le
(74) *Attorney, Agent, or Firm*—Birch, Stewart, Kolasch & Birch, LLP

(57) ABSTRACT

A primary side current value to be shunted from a DC power source (1) to the primary side of a DC power circuit (2) is detected by a primary side current detection resistor (5), and an output current value to be shunted to an inverter curcuit (3) and its downstream is detected by a current detection resistor (6). On the basis of those current values detected, the total current value to flow into a plurality of load curcuits such as the DC power supply circuit (2) and the inverter circuit (3) is detected by a total current detection unit (7). On the basis of the total current value detected, a control unit (8) controls a switching transistor (24) of the DC power circuit (2) to control an output power thereby to control an electric current (Ib) to be fed from the DC power cource (1).

7 Claims, 6 Drawing Sheets

(a)

(b)

DISCHARGE LAMP BALLAST APPARATUS

TECHNICAL FIELD

The present invention relates to a discharge lamp ballast apparatus for turning on discharge lamps used as headlights of automobiles and the like, as lights in indoor or outdoor facilities, warehouses, factories and the like, or as street lights, and more particularly to a discharge lamp ballast apparatus for controlling, in response to the total current value flowing into a load, the current fed from a DC power supply for operating the discharge lamp ballast apparatus.

BACKGROUND ART

Among the discharge lamps, high intensity discharge lamps (HID) such as metal halide valves, high pressure sodium valves and mercury valves have advantages such as large luminous flux, high lamp efficiency and long life. Thus, they have been used as lights in indoor or outdoor facilities, warehouses or factories, or as street lights. Recently in particular, they have been used as headlights of vehicles such as automobiles. To turn on such a discharge lamp, it is necessary to apply a prescribed voltage to the valve at the start, and to superimpose a high voltage start pulse thereon. Thus, the ballast apparatus includes a stabilized DC power supply circuit (DC-DC converter or the like) for lighting the discharge lamp stably, an inverter circuit (AC power supply circuit) for converting the DC voltage to a rectangular wave AC, and anigniter (start circuit) for generating a high voltage starting pulse. In addition, to bring the DC power supply circuit and inverter circuit into operation, their power is supplied from the DC power supply such as a battery. In this case, the power supply must be controlled to prevent an overcurrent. As conventional discharge lamp ballast apparatuses that can prevent the overcurrent, the following examples are known.

A first conventional example relates to a technique of fail-safe operation in case of a ground fault of the electric wiring of a discharge lamp due to some failure. It has a discharge lamp current detecting resistor provided across a low voltage common terminal of an H bridge circuit constituting an inverter circuit and a ground (GND). If the ground fault occurs, the current detecting resistor detects it, and the switching transistors (MOS transistors) constituting the H bridge circuit are turned off in response to the detection, thereby preventing the overcurrent from the DC power supply (for example, see Relevant Reference 1).

A second conventional example relates to a technique for limiting the power supply current to prevent an excessive increase of the power supply current when the DC power supply voltage decreases. It includes a DC power supply circuit (DC-DC converter) using a transformer of the DC/DC converter which has a primary winding and secondary winding isolated from each other; a current detecting resistor provided on the primary winding side for detecting the input current (power supply current) to the DC power supply circuit; and a current limiting controller for limiting the input current to the DC power supply circuit in response to the detection signal, thereby preventing the overcurrent from the DC power supply (for example, see Relevant Reference 2).

Besides the foregoing examples, the following Relevant References 3-6 are enumerated as conventional techniques relating to the power supply in the discharge lamp ballast apparatuses.

Relevant Reference 1
 Japanese patent application laid-open No. 2001-43989.

Relevant Reference 2
 Japanese patent application laid-open No. 7-169585/1995.

Relevant Reference 3
 Japanese patent application laid-open No. 6-188078/1994.

Relevant Reference 4
 Japanese patent application laid-open No. 9-223590/1997.

Relevant Reference 5
 Japanese patent application laid-open No. 2002-110384.

Relevant Reference 6
 Japanese patent application laid-open No. 2003-323992.

The conventional discharge lamp ballast apparatuses are configured as described above. In particular, the first conventional example relates to the technique of preventing the overcurrent at the ground fault, which does not handle the factors other than the ground fault such as the voltage reduction of the DC power supply as in the second conventional example. The boosting transformer of the DC/DC converter used by the DC power supply circuit (DC-DC converter) of the first conventional example is a step-up autotransformer. The step-up autotransformer is preferable as the DC-DC converter because it has a smaller winding and a smaller core. Accordingly, if the first conventional example could include the current detecting resistor between the DC power supply and the ballast apparatus in the same manner as the second conventional example, the first conventional example would be able to achieve the effect of the second conventional example, which would be vastly preferable. However, when the DC/DC converter uses the step-up autotransformer as its transformer, the load current from the DC power supply flows not only through the DC power supply circuit, but also to the post-stage inverter circuit and the like, which differs from the second conventional example that uses the DC/DC converter transformer having the primary winding and secondary winding isolated from each other. In other words, the load current from the single DC power supply is split to a plurality of load circuits such as the DC power supply circuit and inverter circuit. Accordingly, even if the current detecting resistor is provided between the DC power supply and the ballast apparatus as in the second conventional example, the potential on the load side of the current detecting resistor changes with the current. Because of the changes, the voltage across the resistor for detecting the output current flowing through the inverter circuit varies, and this presents a problem in that the power supply current cannot be detected accurately.

The present invention is implemented to solve the foregoing problem. Therefore it is an object of the present invention to provide a discharge lamp ballast apparatus capable of detecting the power supply current fed from the single DC power supply accurately, and capable of controlling the current fed from the DC power supply in response to the detection result in the discharge lamp ballast apparatus with a configuration in which the load current from the single DC power supply is split to a plurality of load circuits such as the DC power supply circuit and inverter circuit as in the case where the step-up autotransformer is used as the transformer constituting the DC power supply circuit (DC-DC converter).

DISCLOSURE OF THE INVENTION

According to the present invention, a discharge lamp ballast apparatus includes: a power supply circuit for converting a voltage from a DC power supply, which is connected to a plurality of load circuits, to a prescribed DC voltage, and for converting the prescribed DC voltage to an AC voltage to be supplied to a discharge lamp; and a start circuit for generating a high voltage pulse and for superimposing the high voltage pulse on the AC voltage to start discharge of the discharge lamp, wherein a controller controls a current supplied from the DC power supply in response to a total value of currents flowing through the plurality of load circuits.

Thus, it offers an advantage of being able to control the current appropriately which is supplied from the DC power supply to the plurality of load circuits.

BRIEF DESCRIPTION OF THE DRAWINGS

FIG. 2(a) is a current waveform chart across a primary side current detecting resistor (R1); and FIG. 2(b) is a current waveform chart across an output current detecting resistor (R2);

BEST MODE FOR CARRYING OUT THE INVENTION

The best mode for carrying out the invention will now be described with reference to the accompanying drawings to explain the present invention in more detail.

EMBODIMENT 1

Figure 1:
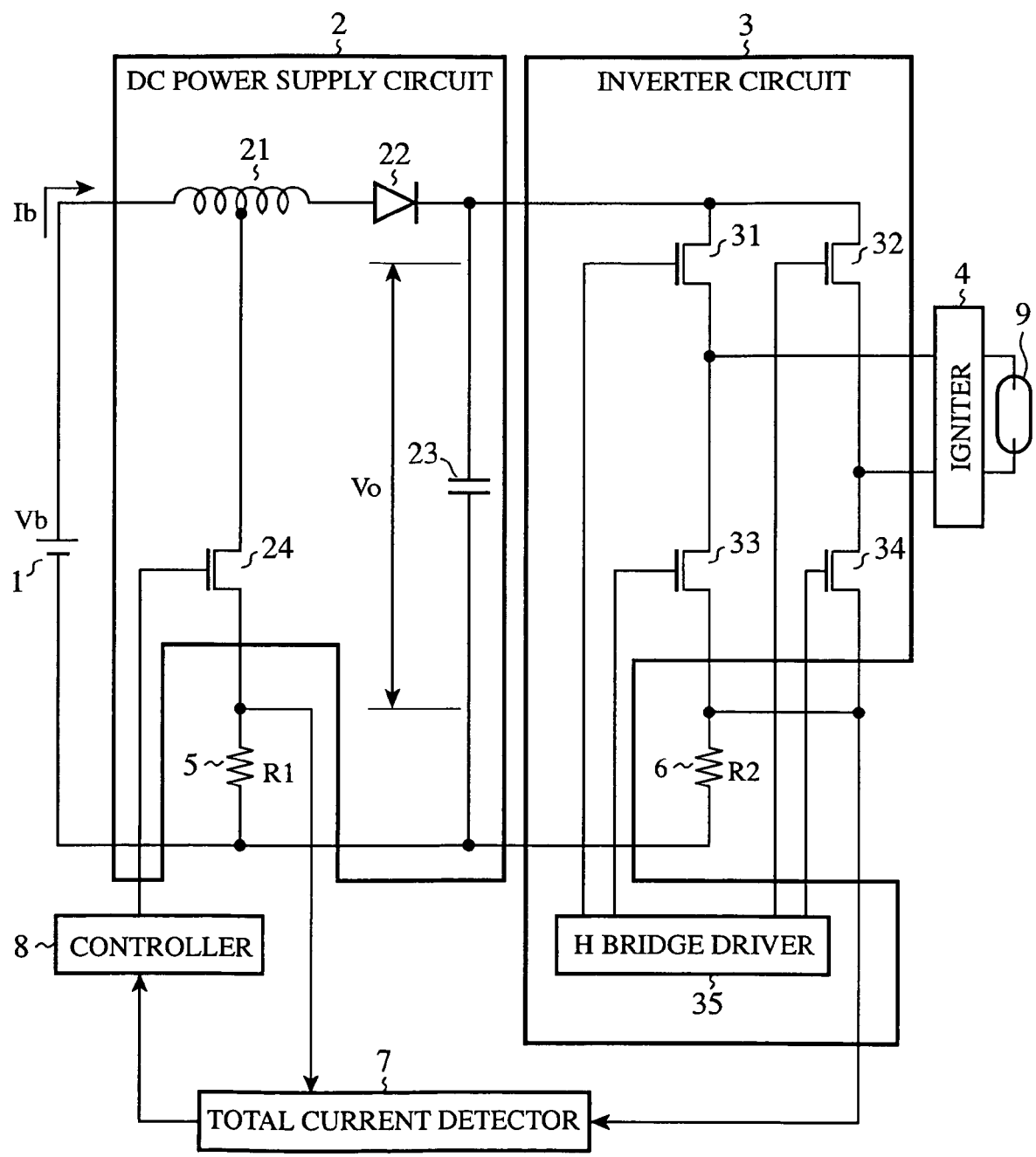
FIG. 1 is a circuit diagram showing a basic configuration of a discharge lamp ballast apparatus of an embodiment 1 in accordance with the present invention.

FIG. 1 is a circuit diagram showing a basic configuration of a discharge lamp ballast apparatus of the embodiment 1 in accordance with the present invention.

In FIG. 1, the discharge lamp ballast apparatus includes a DC power supply 1, a DC power supply circuit 2, an inverter circuit 3, an igniter 4, a primary side current detecting resistor 5 (R1), an output current detecting resistor 6 (R2), a total current detector 7 and a controller 8.

In the configuration, the DC power supply 1 is a DC power supply such as a battery with a DC voltage Vb.

The DC power supply circuit 2 is a DC-DC converter which includes a step-up autotransformer 21 (called "autotransformer 21" from now on), a rectifier diode 22 for converting the AC voltage generated by the autotransformer 21 to a DC voltage, a smoothing capacitor 23, and a switching transistor 24 consisting of a MOS FET. It converts the DC voltage Vb fed from the DC power supply 1, which is applied to the primary side of the autotransformer 21, to a DC voltage Vo of a prescribed voltage, and outputs it from the secondary side of the autotransformer 21.

The inverter circuit 3 includes an H bridge circuit consisting of four FETs 31, 32, 33 and 34, and an H bridge driver 35 for controlling the H bridge circuit in such a manner that the pair of the FETs 31 and 34 and the pair of the FETs 32 and 33 are turned on and off alternately. Thus, it converts the DC voltage Vo fed from the DC power supply circuit 2 to an AC voltage with a rectangular wave. The DC power supply circuit 2 and the inverter circuit 3 constitute a power supply circuit of the discharge lamp ballast apparatus in a broad sense.

The igniter 4 generates the high voltage starting pulse from the voltage fed from the DC power supply circuit 2, and applies it to the discharge lamp 9 to start the discharge. Thus the igniter has the discharge lamp 9 start lighting by supplying the high voltage pulse.

The primary side current detecting resistor 5 (R1), which constitutes a first load current detecting means, detects the primary side current of the autotransformer 21 of the DC power supply circuit 2, which is caused to flow by the DC voltage Vb of the DC power supply 1, as a voltage signal. The current is the load current of the DC power supply 1.

Figure 2:
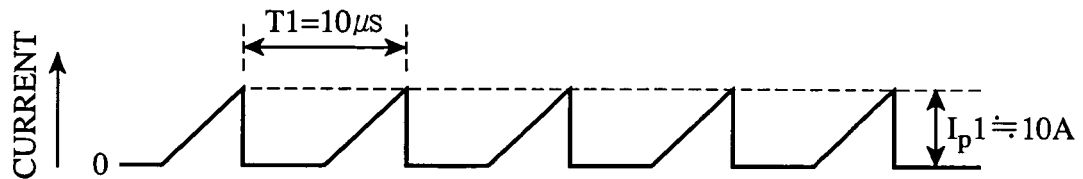
FIG. 2 relates to the discharge lamp ballast apparatus of the embodiment 1 in accordance with the present invention.
Figure 2:
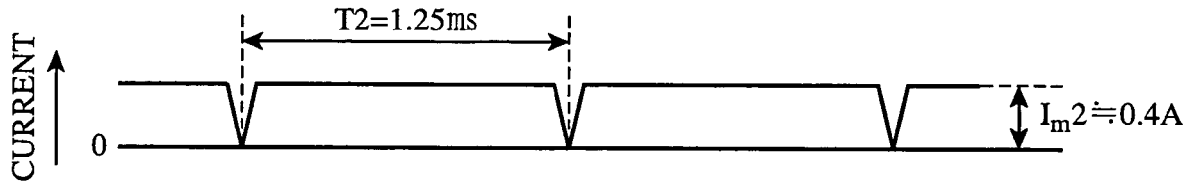

FIG. 2(a) illustrates a current waveform flowing through the primary side current detecting resistor 5 (R1), which shows that a sawtooth current with a peak value (Ip1) of about 10 A and a period (T1) of about 10 μs is flowing.

The output current detecting resistor 6 (R2), which constitutes a second load current detecting means, detects the output current of the inverter circuit 3 onward, which is caused to flow by the DC voltage Vb of the DC power supply 1, as a voltage signal. The output current, which is detected from the current flowing through the inverter circuit 3, is the sum total of the currents flowing through the inverter circuit 3, igniter 4 and discharge lamp 9, and hence it is the load current of the DC power supply 1.

FIG. 2(b) illustrates a current waveform flowing through the output current detecting resistor 6 (R2), which shows that an intermittent current with a maximum current value (Im2) of about 0.4 A and a period (T2) of about 1.25 ms is flowing.

The total current detector 7 detects the total current value flowing through the plurality of load circuits from the load currents detected by the primary side current detecting resistor 5 (R1) and the output current detecting resistor 6 (R2).

The controller 8 controls the output power of the DC power supply circuit 2 by carrying out the switching control of its switching transistor 24 in response to the total current value detected by the total current detector 7, thereby controlling the current Ib fed from the DC power supply 1.

Next, a concrete configuration of the total current detector 7 and its operation will be described.

Figure 3:
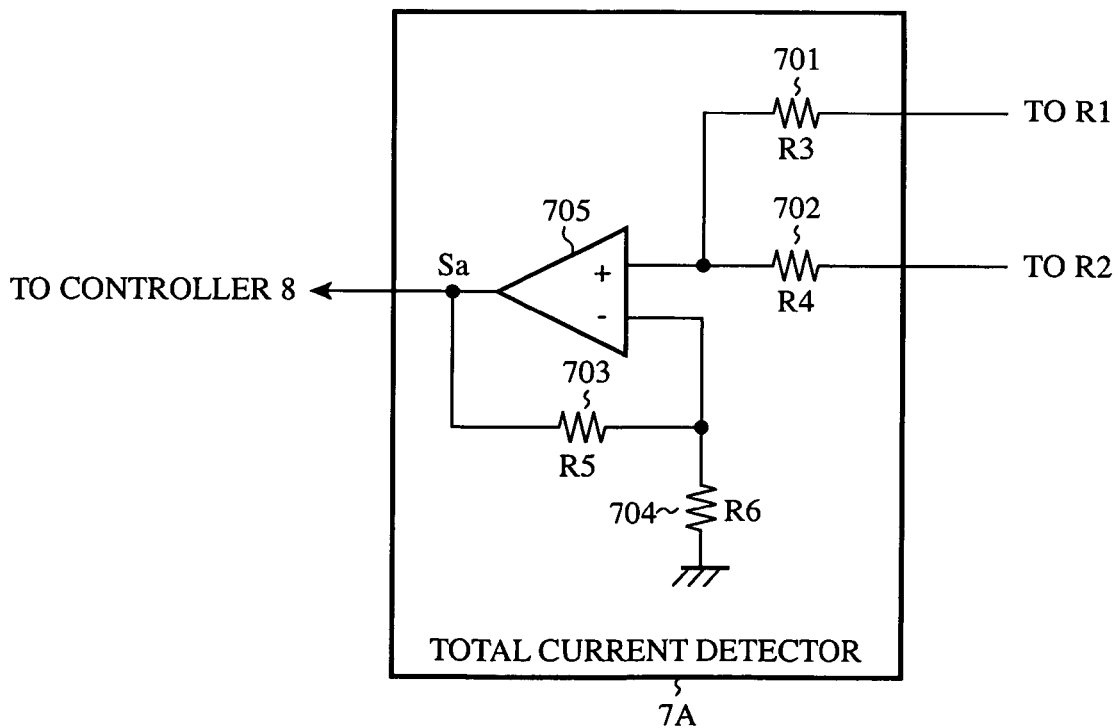
FIG. 3 is a circuit diagram showing a configuration of a total current detector of the discharge lamp ballast apparatus of the embodiment 1 in accordance with the present invention.

FIG. 3 is a circuit diagram showing a configuration of a total current detector 7A of the discharge lamp ballast apparatus of the embodiment 1.

In FIG. 3, the total current detector 7A includes resistors 701 (R3), 702 (R4), 703 (R5) and 704 (R6) and an amplifier 705, which constitute a summing amplifier circuit. The amplifier 705 consists of an operational amplifier, for example.

In the configuration, the resistor 701 (R3) is connected to the primary side current detecting resistor 5 (R1), and the resistor 702 (R4) is connected to the output current detecting resistor 6 (R2). Through the two resistors 701 (R3) and 702 (R4), the voltage signal corresponding to the primary side current of the DC power supply circuit 2, which is detected by the primary side current detecting resistor 5 (R1), and the voltage signal corresponding to the output current of the inverter circuit 3 onward, which is detected by the output current detecting resistor 6, (R2) are combined, and the combined voltage signal is input to the non-inverting input terminal (+terminal) of the amplifier 705. To the inverting input terminal (−terminal), the resistors 703 (R5) and 704 (R6) are connected as shown in FIG. 3. The amplifier 705, amplifying the combined voltage signal, detects and outputs a signal Sa corresponding to the total current value of the primary side current of the DC power supply circuit 2 flowing through the primary side current detecting resistor 5 (R1) and the output current of the inverter circuit 3 onward flowing through the output current detecting resistor 6 (R2) Thus, the signal Sa is obtained which indicates the total current value corresponding to the current Ib fed from the DC power supply 1.

Here, the amplifier 705 using the operational amplifier operates as a non-inverting amplifier, and its voltage amplification factor Av across the input and output is given by Av=1+(R5/R6).

As for ratios between the resistors, they can be placed at (R2/R1)=(R4/R3)=(R6/R5) considering the resistance values of the primary side current detecting resistor 5 (R1) and output current detecting resistor 6 (R2).

The signal Sa, which represents the total current value and is output from the amplifier 705, is delivered to the controller 8. In response to the signal Sa representing the total current value, the controller 8 carries out the switching control of the switching transistor 24 of the DC power supply circuit 2 to control its output power, thereby controlling the current Ib fed from the DC power supply 1. In this case, the controller 8 controls the output power in such a manner that the DC voltage Vo of the DC power supply circuit 2 is maintained nearly at constant within the overcurrent limiting value of the DC power supply 1, which is set in advance by the signal Sa representing the total current value. In contrast, when the signal Sa representing the total current value exceeds the overcurrent limiting value, the controller 8 limits the output power of the DC power supply circuit 2, thereby imposing the overcurrent limitation on the current fed from the DC power supply 1.

As described above, the present embodiment 1 is configured such that the primary side current detecting resistor 5 detects the primary side current value divided from the DC power supply 1 to the primary side of the DC power supply circuit 2; the output current detecting resistor 6 detects the output current value divided from the DC power supply 1 to the inverter circuit 3 onward; the total current detector 7 detects the total current value flowing into the plurality of load circuits such as the DC power supply circuit 2 and the inverter circuit 3 from the primary side current value and output current value detected; and the controller 8 controls the output power by controlling the switching transistor 24 of the DC power supply circuit 2 in response to the total current value detected, thereby controlling the current Ib fed from the DC power supply 1. As a result, the discharge lamp ballast apparatus, which is configured in such a manner that the load current is split from the single DC power supply 1 to the plurality of load circuits such as the DC power supply circuit 2 and inverter circuit 3 in the case where the autotransformer 21 is used by the DC power supply circuit 2, can detect the current value corresponding to the power supply current value flowing out of the single DC power supply 1 accurately, and can control the current Ib fed from the DC power supply 1 appropriately in response to the detected result.

In addition, the controller 8 is configured such that if the signal Sa representing the total current value exceeds the preset overcurrent limiting value of the DC power supply 1, the controller 8 limits the output power of the DC power supply circuit 2 to impose the overcurrent limitation on the current fed from the DC power supply 1. Accordingly, the controller 8 can protect the load circuits such as the DC power supply 1 and DC power supply circuit 2 from the overcurrent.

Furthermore, since the detecting circuit based on the primary side current detecting resistor 5 and the detecting circuit based on the output current detecting resistor 6 are independent of each other, they can each detect the current accurately without interference.

Moreover, the total current detector 7A is configured such that it sums up and amplifies with the amplifier 705 the primary side current value detected by the primary side current detecting resistor 5 and the output current value detected by the output current detecting resistor 6. Thus, it can add the two values without error by the simple circuit configuration, and can detect the current value corresponding to the power supply current value flowing from the DC power supply 1 to the plurality of load circuits.

EMBODIMENT 2

Figure 4:
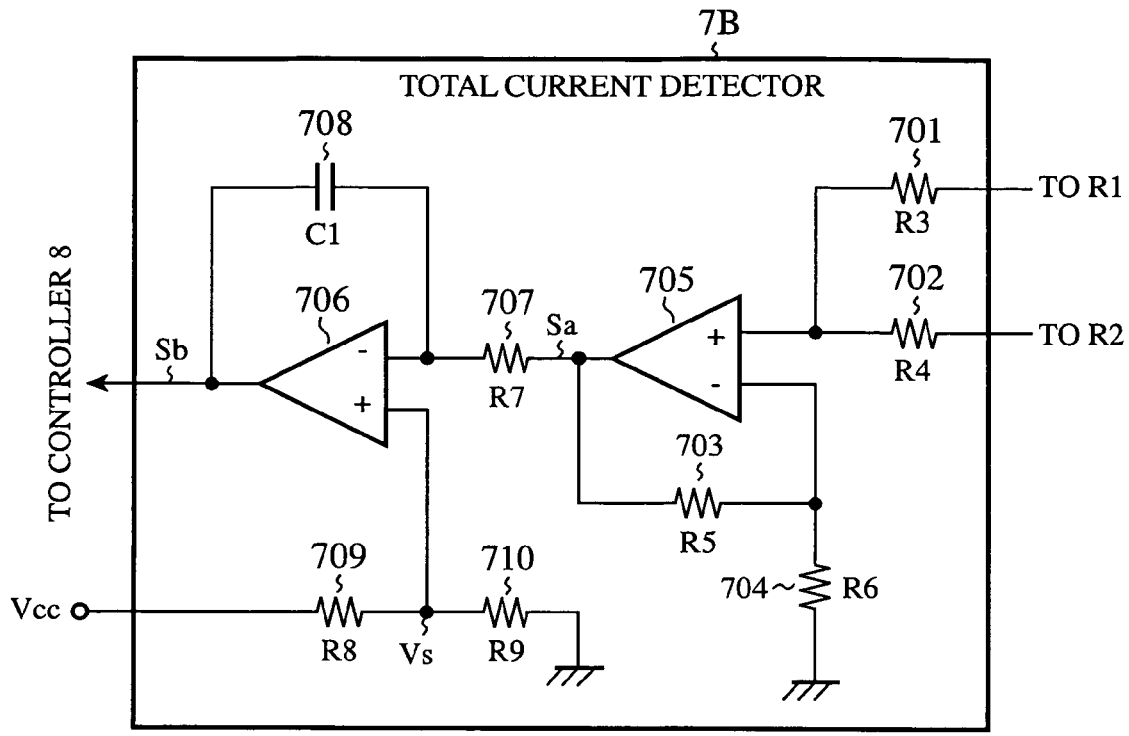
FIG. 4 is a circuit diagram showing a configuration of a current detector of a discharge lamp ballast apparatus of an embodiment 2 in accordance with the present invention.

FIG. 4 is a circuit diagram showing a configuration of a total current detector 7B of the discharge lamp ballast apparatus of an embodiment 2 in accordance with the present invention. In FIG. 4, the same reference numerals as those of FIG. 3 designate the same components, and their description is omitted here.

In FIG. 4, the total current detector 7B of the present embodiment 2 has a comparator 706 provided at the post-stage of the summing amplifier circuit composed of the same amplifier 705 as that of FIG. 3. An integrating function is added to the comparator 706 by providing an integrating circuit consisting of a resistor 707 (R7) and a capacitor 708 (C1). The integrating function of the integrating circuit is provided for preventing reaction to instantaneous fluctuations such as noise. In addition, the comparator 706 is composed of an operational amplifier, for example, and its non-inverting input terminal (+terminal) is set at a voltage Vs obtained by dividing the DC voltage Vcc with a resistor 709 (R8) and a resistor 710 (R9) The voltage Vs is used as a reference value for the overcurrent decision (called "reference value Vs" from now on). The reference value Vs is obtained by dividing the stabilized DC voltage Vcc such as 3 V or 5 V, thereby achieving the stabilized reference value Vs without fluctuations.

The comparator 706, resistor 709 (R8) and resistor 710 (R9) constitute a comparing circuit.

With the foregoing configuration, the signal Sa representing the total current value, which is output from the amplifier 705, is supplied to the inverting input terminal (−terminal) of the comparator 706 via the resistor 707 (R7), and is compared with the reference value Vs set at the non-inverting input terminal (+terminal). In this case, the signal Sa representing the total current value undergoes the integration by the integrating circuit consisting of the resistor 707 (R7) and capacitor 708 (C1). Thus, even if the signal Sa representing the total current value fluctuates instantaneously, the comparator 706 can circumvent the effect of the fluctuations. For example, even if the signal Sa representing the total current value becomes an instantaneous large current because of noise or the like, the comparator 706 is impervious to it. Incidentally, as for the values of the resistor 707 (R7) and capacitor 708 (C1) that determine the time constant of the integrating circuit, they can be set flexibly, and suitably setting the values makes it possible to achieve intended response characteristics with ease.

In the comparison by the comparator 706, when the signal Sa representing the total current value, which is input via the integrating circuit consisting of the resistor 707 (R7) and the capacitor 708 (C1), does not exceed the reference value Vs, the comparator 706 sets the controller 8 at a normal control state. According to the setting, the controller 8 as shown in FIG. 1 controls the output power by carrying out the switching control of the switching transistor 24 in such a manner as to maintain the DC voltage Vo of the DC power supply circuit 2 at approximately constant, thereby controlling the current Ib fed from the DC power supply 1.

In contrast, when the signal Sa representing the total current value exceeds the reference value Vs in the comparison by the comparator 706, the comparator 706 supplies the controller 8 with the signal (Sb) instructing it to perform the overcurrent limitation. According to the instruction signal supplied, the controller 8 limits the output power by the switching control of the switching transistor 24 of the DC power supply circuit 2, thereby imposing the overcurrent limitation on the current fed from the DC power supply 1.

As described above, according to the present embodiment 2, the total current detector 7B is configured in such a manner that the amplifier 705 sums up and amplifies the signals corresponding to the primary side current value detected by the primary side current detecting resistor 5 and the output current value detected by the output current detecting resistor 6; the comparator 706, receiving the output of the amplifier 705 via the resistor 707 (R7) constituting the integrating circuit, compares the output with the reference value Vs; and when the output of the amplifier 705 exceeds the reference value Vs, the comparator 706 supplies the controller 8 with the signal Sb instructing it to limit the output power of the DC power supply circuit 2 to impose the overcurrent limitation on the current fed from the DC power supply 1. As a result, the primary side current of the DC power supply circuit 2 is reduced, and the current flowing out of the DC power supply 1 is limited. This makes it possible to protect the load circuits such as the DC power supply 1 and DC power supply circuit 2 from the overcurrent.

In addition, since the comparator 706 is provided with the integrating circuit consisting of the resistor 707 (R7) and capacitor 708 (C1), even if the signal Sa representing the total current value fed from the amplifier 705 increases to a large current instantaneously due to noise or the like, for example, the comparator 706 can circumvent its effect.

EMBODIMENT 3

Figure 5:
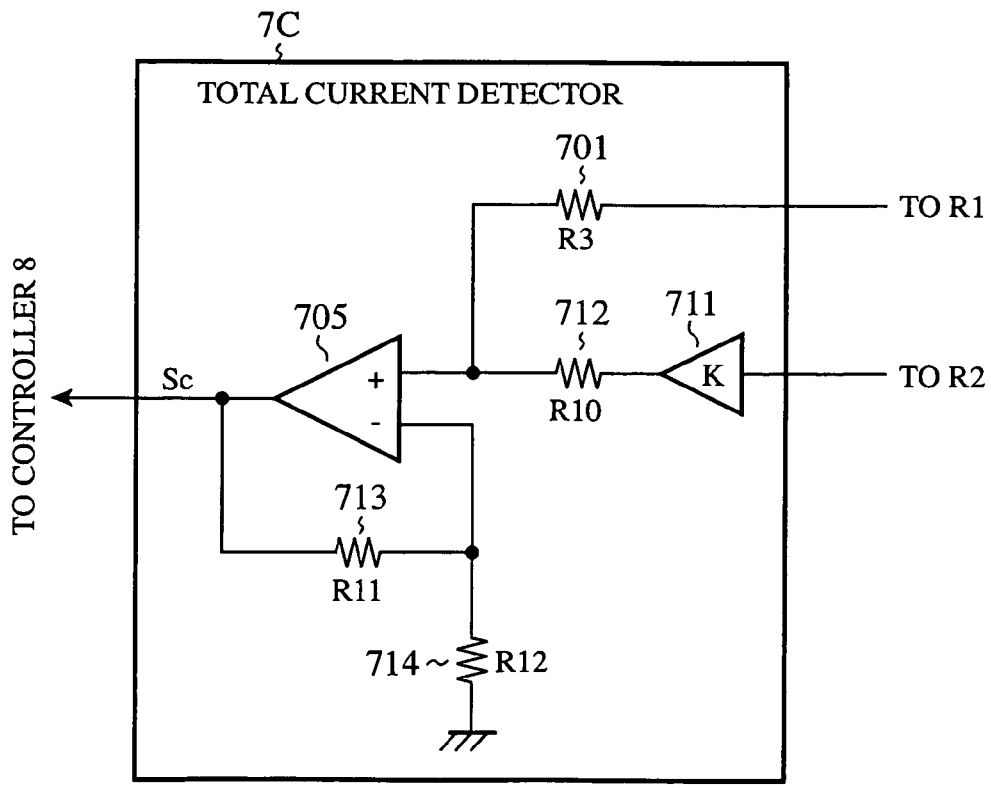
FIG. 5 is a circuit diagram showing a configuration of a current detector of a discharge lamp ballast apparatus of an embodiment 3 in accordance with the present invention.

FIG. 5 is a circuit diagram showing a configuration of a total current detector 7C of the discharge lamp ballast apparatus of an embodiment 3 in accordance with the present invention. In FIG. 5, the same reference numerals as those of FIG. 3 designate the same components, and their description is omitted here.

In FIG. 5, the total current detector 7C according to the present embodiment 3 is configured in such a manner that an amplifier 711 (called "first amplifier 711" in the present embodiment 3) is provided for amplifying the voltage signal representing the output current of the inverter circuit 3 onward, which is detected by the output current detecting resistor 6 (R2); and the amplified output is supplied to the non-inverting input terminal (+terminal) of the amplifier 705 (called "second amplifier 705" in the present embodiment 3) constituting the summing amplifier circuit of FIG. 3 via the resistor 712 (R10) Here, the first amplifier 711 constitutes an amplifier circuit whose voltage amplification factor Av1 is given by Av1=K.

As for the voltage amplification factor Av2 of the second amplifier 705 that operates as the non-inverting amplifier as in FIG. 3, it is not necessary to be equal to that of FIG. 3. For example, the resistors for setting the amplification factor can be changed to a resistor 713 (R11) and a resistor 714 (R12) from those of the configuration of FIG. 3. In this case, the voltage amplification factor Av2 from the input to the output is given by Av2=1+(R11/R12).

It is preferable that the primary side current detecting resistor 5 (R1) and output current detecting resistor 6 (R2) have as low resistance as possible from the viewpoint of reducing the power consumption. However, the voltage drop across the resistor decreases as its resistance becomes lower, and the detecting accuracy of the current reduces. In addition, the current flowing through the output current detecting resistor 6 (R2) is much smaller than the current flowing through the primary side current detecting resistor 5 (R1). Accordingly, amplifying the voltage signal from the output current detecting resistor 6 (R2) with the first amplifier 711 can prevent the reduction in the detecting accuracy of the current even when the output current detecting resistor 6 (R2) has a low resistance.

The voltage signal output from the first amplifier 711 is combined via the resistor 712 (R10) with the voltage signal fed from the primary side current detecting resistor 5 (R1) via the resistor 701 (R3). The combined voltage signal is supplied to the non-inverting input terminal (+terminal) of the second amplifier 705, and the following operation is the same as that of FIG. 3. Thus, the second amplifier 705 detects the signal Sc representing the total current value, the sum of the primary side current of the DC power supply circuit 2 flowing through the primary side current detecting resistor 5 (R1) and the output current of the inverter circuit 3 onward flowing through the output current detecting resistor 6 (R2), and supplies it to the controller 8. The controller 8 operates in the same manner as described above in connection with FIG. 3.

As for the ratios between the resistors, they can be set as follows considering the voltage amplification factor K of the first amplifier 711.

$$(KR2/R1)=(R10/R3)=(R12/R11)$$

As described above, according to the present embodiment 3, the total current detector 7C is configured in such a manner that the first amplifier 711 amplifies the signal corresponding to the output current value detected by the output current detecting resistor 6; and the second amplifier 705 sums up and amplifies the output signal of the first amplifier 711 and the signal corresponding to the primary side current value detected by the primary side current detecting resistor 5. Thus, the present embodiment 3 can prevent the deterioration in the detecting accuracy of the current even if the output current detecting resistor 6 (R2) is made low resistance to reduce the consumption power, thereby being able to obtain the summing amplifier output with a small error from the second amplifier 705.

EMBODIMENT 4

Figure 6:
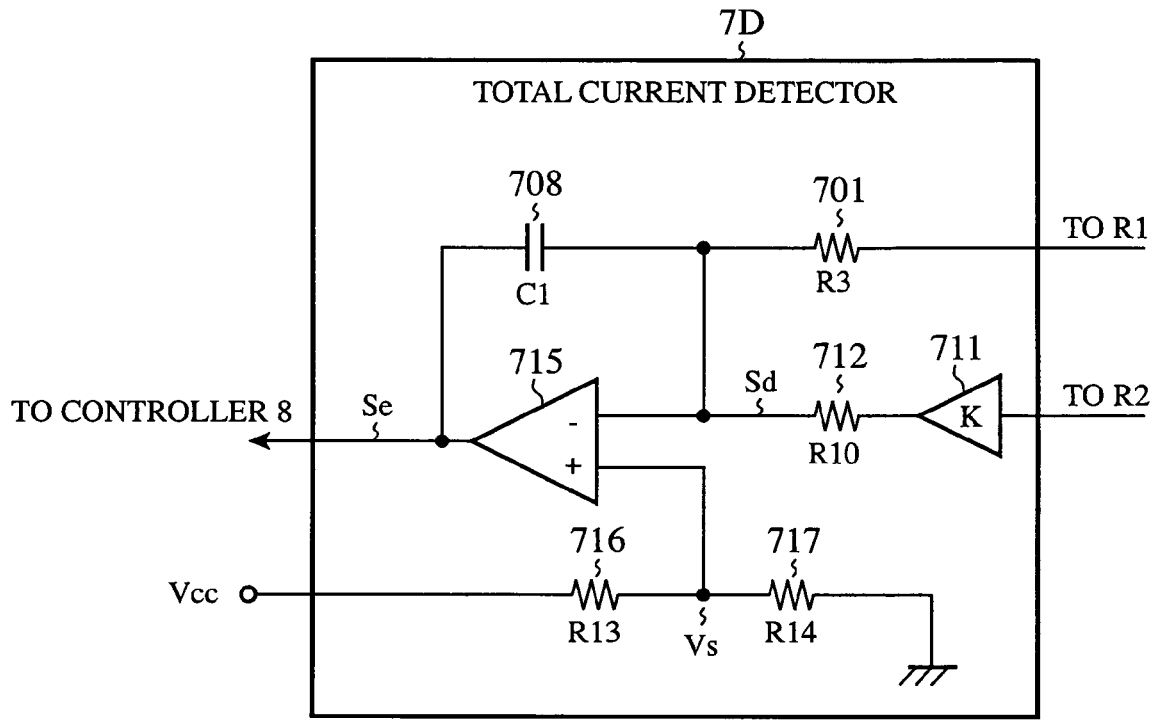
FIG. 6 is a circuit diagram showing a configuration of a current detector of a discharge lamp ballast apparatus of an embodiment 4 in accordance with the present invention.

FIG. 6 is a circuit diagram showing a configuration of a total current detector 7D of the discharge lamp ballast apparatus of an embodiment 4 in accordance with the present invention. In FIG. 6, the same reference numerals as those of FIG. 3 or 5 designate the same components, and their description is omitted here.

In FIG. 6, the total current detector 7D according to the present embodiment 4 is configured by providing the overcurrent decision function by the comparator 706 as described in the embodiment 2 (FIG. 4) and the amplifying function by the amplifier 711 as described in the embodiment 3 (FIG. 5).

As for the operation of the portion including the resistor 701 (R3), amplifier 711 and resistor 712 (R10) in FIG. 6, it is the same as described above with reference to FIG. 5. The voltage signal, which is obtained by combining the voltage signal fed from the primary side current detecting resistor 5 (R1) via the resistor 701 (R3) and the voltage signal fed from the output current detecting resistor 6 (R2) via the amplifier 711 and resistor 712 (R10), is supplied to the inverting input terminal (−terminal) of the comparator 715 consisting of an operational amplifier, for example. At the non-inverting input terminal (+terminal) of the comparator 715, the reference value Vs, which is obtained by dividing the DC voltage Vcc by the resistor 716 (R13) and resistor 717 (R14) as in FIG. 4, is set for making an overcurrent decision. The reference value Vs is produced by dividing the stabilized DC voltage Vcc such as 3 V or 5 V as in FIG. 4, thereby generating the stabilized reference value Vs without fluctuations.

The comparator 715, resistor 716 (R13) and resistor 717 (R14) constitute the comparing circuit.

In addition, the comparator 715 is provided with an integrating circuit consisting of resistors 701 (R3) and 712 (R10) and a capacitor 708 (C1) as in FIG. 4 to prevent it from responding to instantaneous fluctuations such as noise.

The comparator 715 operates in the same manner as the comparator 706 of FIG. 4 basically. As long as a signal Sd representing the total current value, which is fed via the integrating circuit consisting of the resistors 701 (R3) and 712 (R10) and the capacitor 708 (C1), does not exceed the reference value Vs, the comparator 715 sets the controller 8 at the normal control state. According to the setting, the controller 8 as shown in FIG. 1 controls the output power by carrying out the switching control of the switching transistor 24 in such a manner as to maintain the DC voltage Vo of the DC power supply circuit 2 at nearly constant, thereby controlling the current Ib fed from the DC power supply 1.

In contrast, when the signal Sd representing the total current value exceeds the reference value Vs in the comparison by the comparator 715, the comparator 715 supplies the controller 8 with a signal (Se) instructing it to perform the overcurrent limitation. According to the instruction signal supplied, the controller 8 limits the output power by carrying out the switching control of the switching transistor 24 of the DC power supply circuit 2, thereby imposing the overcurrent limitation on the current fed from the DC power supply 1.

As for the comparator 715, the second amplifier 705 described in the embodiment 3 (FIG. 5) can be used as the comparator 715. In this case, the amplifier 711 can be removed. Thus, the summing amplifier and the overcurrent detecting comparator can be integrated. In addition, the integrating circuit including the capacitor 708 (C1) and others can be added to the integrated summing amplifier.

As described above, according to the present embodiment 4, the total current detector 7D is configured in such a manner that the first amplifier 711 amplifies the signal of the output current value detected by the output current detecting resistor 6; the comparator 715 compares with the reference value Vs the signal produced by combining the output signal of the first amplifier 711 and the signal representing the primary side current value detected by the primary side current detecting resistor 5; and the comparator 715 supplies the controller 8 with the signal Se that instructs the controller 8 to impose the overcurrent limitation on the current fed from the DC power supply 1 by limiting the output power of the DC power supply circuit 2 when the signal Sd representing the total current value exceeds the reference value Vs. As a result, the primary side current of the DC power supply circuit 2 is reduced, and hence the current flowing from the DC power supply 1 is limited, thereby being able to protect the load circuits such as the DC power supply 1 and DC power supply circuit 2 from the overcurrent.

In addition, since the comparator 715 is provided with the integrating circuit consisting of the resistors 701 (R3) and 712 (R10) and the capacitor 708 (C1), even if the signal Sd representing the total current value increases sharply to an instantaneous large current due to noise or the like, for example, the comparator 715 can circumvent its effect.

In addition, using the second amplifier 705 of the embodiment 3 (FIG. 5) as the comparator 715 of the present embodiment 4 enables the integration of the summing amplifier and the overcurrent detecting comparator. Furthermore, adding the integrating circuit including the capacitor 708 (C1) and others to the integrating circuit enables the response characteristics unresponsive to the instantaneous large current. Thus, it can implement the functions of the current addition, comparison and response characteristics necessary for the overcurrent limitation with a simple configuration.

EMBODIMENT 5

Figure 7:
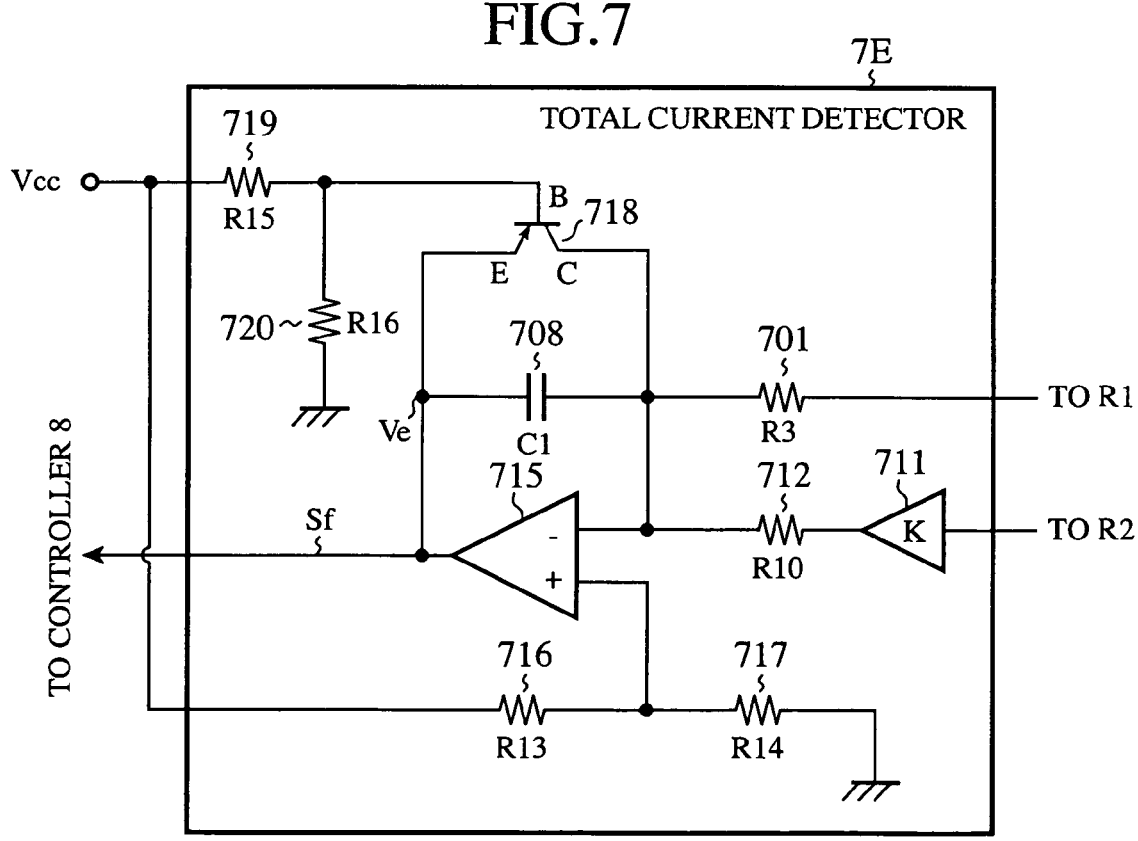
FIG. 7 is a circuit diagram showing a configuration of a current detector of a discharge lamp ballast apparatus of an embodiment 5 in accordance with the present invention.

FIG. 7 is a circuit diagram showing a configuration of a total current detector 7E of the discharge lamp ballast apparatus of an embodiment 5 in accordance with the present invention. In FIG. 7, the same reference numerals as those of FIGS. 3, 5 and 6 designate the same components, and their description is omitted here.

In FIG. 7, the total current detector 7E of the present embodiment 5 includes, in addition to the configuration of the embodiment 4, a transistor (PNP type) 718, and a resistor 719 (R15) and a resistor 720 (R16) for setting the base voltage of the transistor 718. The additional portion constitutes an integrating circuit voltage setting means.

The purpose of the transistor 718 and others is to improve the response characteristic provided by adding the integrating circuit composed of the resistors 701 (R3) and 712 (R10) and the capacitor 708 (C1) to the comparator 715.

The improvement of the response characteristic by the transistor 718 and others will be described below with reference to FIG. 8.

Figure 8:
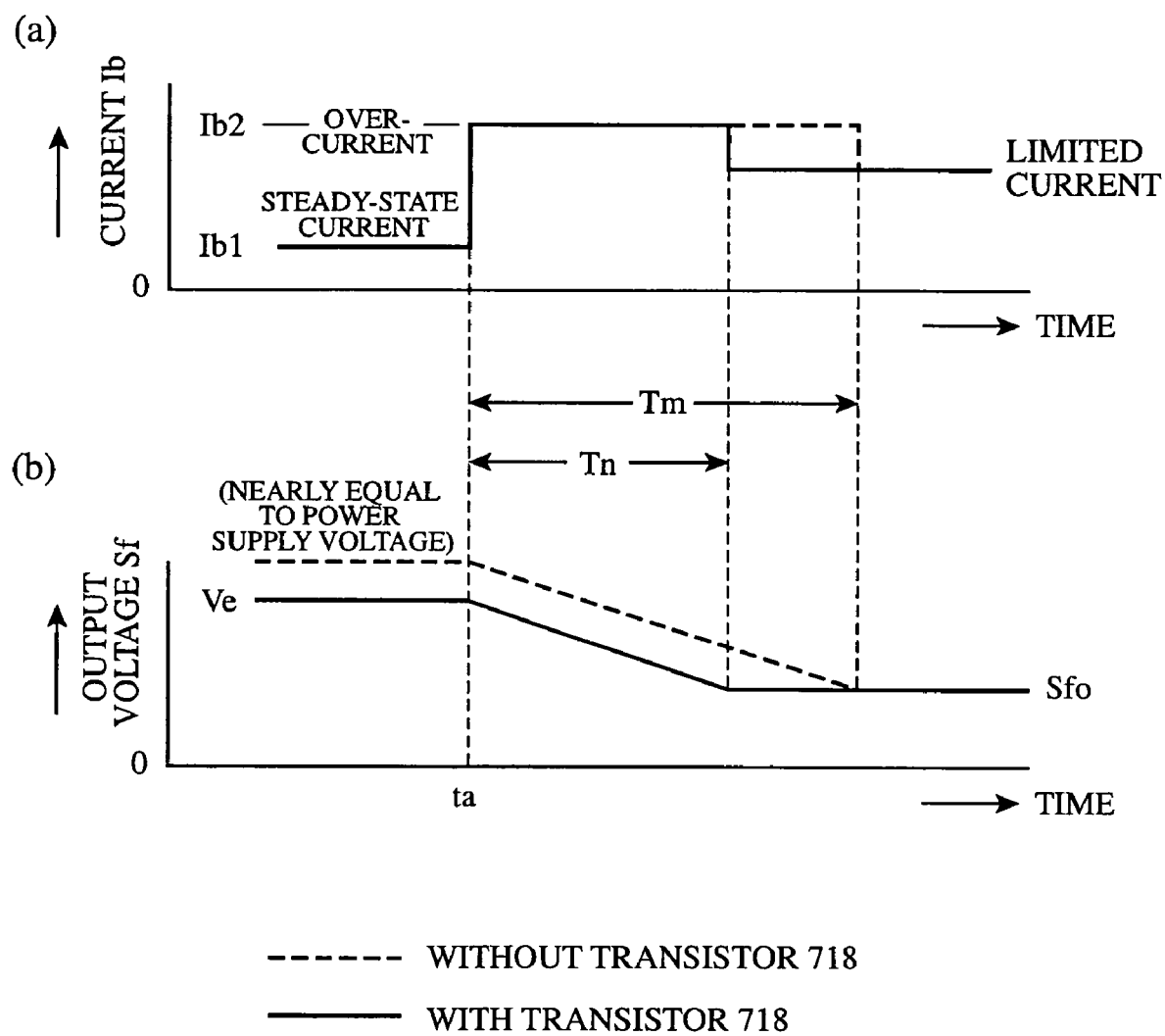
FIG. 8 relates to the discharge lamp ballast apparatus of the embodiment 5 in accordance with the present invention, and illustrates timing relationships between the current fed from the DC power supply (FIG. 8(a)) and the output signal of a comparator (FIG. 8(b))

FIG. 8 is a diagram showing relationships of the current Ib (FIG. 1) fed from the DC power supply 1 against time, and relationship of the output signal Sf of the comparator 715 against time: FIG. 8(a) illustrates the current Ib; and FIG. 8(b) illustrates the output signal (voltage signal) Sf.

Referring to FIG. 8, consider the case where the transistor 718 is not provided. In this case, when the current Ib is in a state of a low input current (steady-state current) Ib1 before the timing ta during which no overcurrent occurs, the output signal Sf (voltage) of the comparator 715 having the integrating function is nearly equal to the power supply voltage (Vcc) fed to the comparator 715 as shown by a broken line. When the current Ib becomes the overcurrent Ib2 after the timing ta onward, the output signal Sf of the comparator 715 begins to drop as shown by the broken line. The level at which the voltage drop starts is nearly equal to the power supply voltage. In this case, the slope of the drop of the output signal Sf is determined by the integration constant of the resistors 701 (R3) and 712 (R10) and the capacitor 708 (C1). Thus, when the level of the output signal Sf for starting the overcurrent limitation in the controller 8 (FIG. 1) is Sfo, the time period for the output signal Sf to start dropping and reach Sfo is Tm.

In contrast with this, when the transistor 718 is provided, the operation proceeds as follows.

When the current Ib is in the low input current (steady-state current) Ib1 state before the timing ta, during which no overcurrent occurs, the transistor 718 is kept on to bring its collector (C) and emitter (E) into conduction, so that the capacitor 708 (C1) is short-circuited. To achieve this, the base (B) is supplied with a prescribed voltage which is obtained by dividing a stabilized voltage such as 5 V power supply voltage Vcc by the resistor 719 (R15) and resistor 720 (R16) to bring the transistor into conduction. In this ON state, the emitter voltage Ve of the transistor 718 is given by the following expression when the transistor 718 has Vbe=0.7 (V).

$$Ve=\{(R16 \cdot Vcc)/(R15+R16)\}+0.7 \quad (V)$$

The solid line of FIG. 8(b) shows the emitter voltage Ve when the transistor 718 is in the ON state. The emitter voltage Ve is also the level of the output signal Sf of the comparator 715, which is kept constant as long as the power supply voltage Vcc is not varied. Accordingly, the level at the drop start timing when the current Ib becomes the overcurrent Ib2 after the timing ta onward is equal to the emitter voltage Ve. As a result, the drop time for the output voltage Sf to reach the output signal Sfo for starting the overcurrent limitation is Tn. As for the down slope, it is determined by the integration constant of the resistors 701 (R3) and 712 (R10) and the capacitor 708 (C1) as in the case where no transistor 718 is provided.

The dropping time period Tn is shorter than the dropping time period Tm in which the transistor 718 is not provided, thereby being able to shorten the time period for starting the overcurrent limitation, and to accelerate the response characteristic of the overcurrent limitation.

The basic operation other than the foregoing description is the same as that of the embodiment 4 (FIG. 6), and its description is omitted here.

As described above, the present embodiment 5 is configured in such a manner that the total current detector 7E includes, in addition to the configuration of the total current detector 7D of the embodiment 4 (FIG. 6), the integrating circuit voltage setting means for limiting the output voltage of the integrating circuit composed of the resistors 701 (R3) and 712 (R10) and the capacitor 708 (C1) provided to the comparator 715. Thus, the present embodiment is waiting with limiting the output of the integrating circuit (the emitter of the transistor 718) to the prescribed voltage (Ve), and hence it can shorten the time period until the comparator 715 supplies the controller 8 with the signal Sf for instructing the start of the overcurrent limitation. Consequently, it can implement the integrating circuit that does not respond to the instantaneous large current, but responds to a continuous overcurrent quickly, thereby being able to carry out the overcurrent limitation with the quick response characteristic.

EMBODIMENT 6

Figure 9:
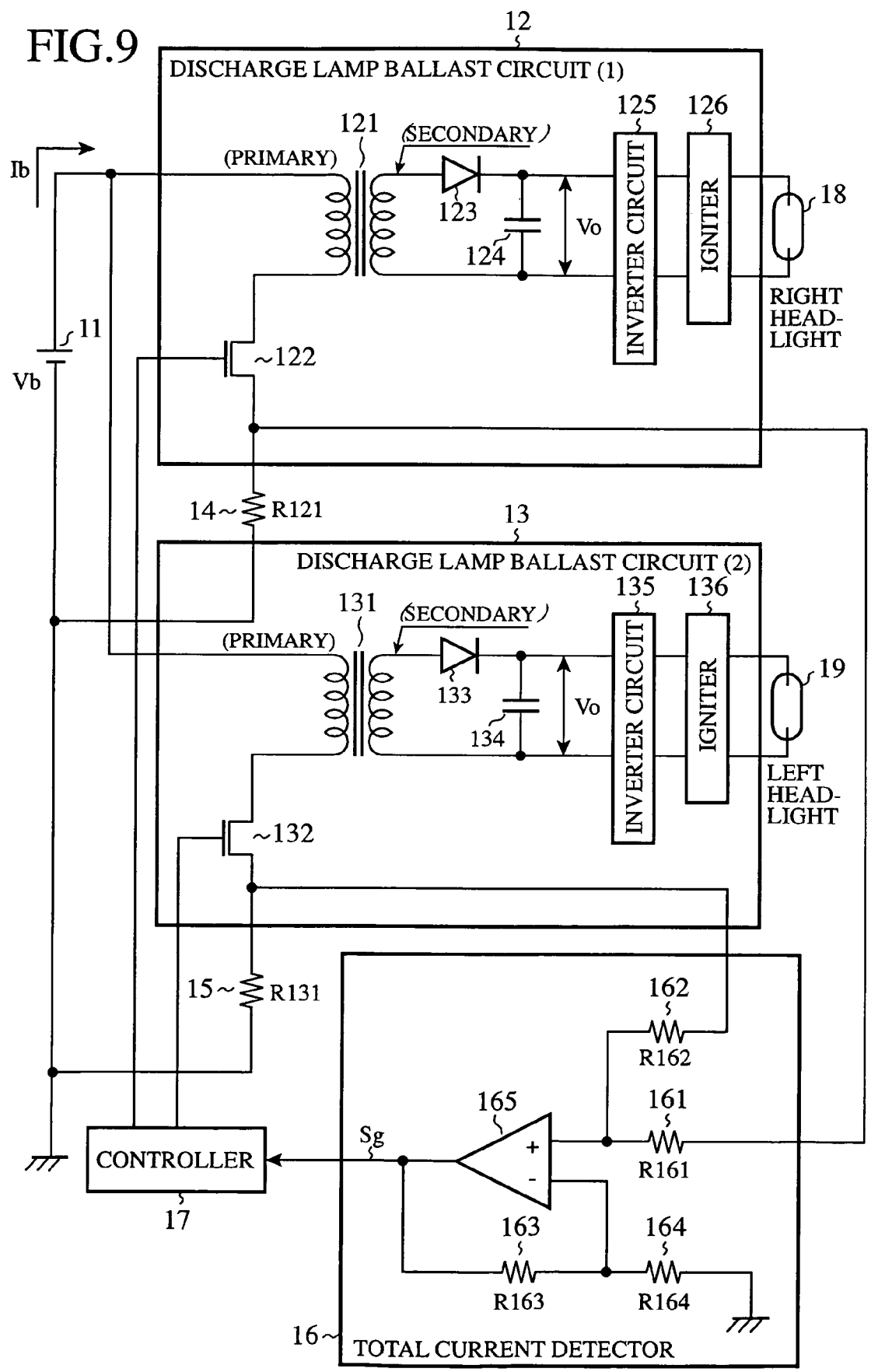
FIG. 9 is a circuit diagram showing a configuration of a discharge lamp ballast apparatus of an embodiment 6 in accordance with the present invention.

FIG. 9 is a circuit diagram showing a configuration of a discharge lamp ballast apparatus of the embodiment 6 in accordance with the present invention. It serves as a discharge lamp ballast apparatus of the right and left headlights of an automobile.

The foregoing embodiment 1 has as the load of the DC power supply 1 the DC power supply circuit 2 and inverter circuit 3 in the discharge lamp ballast apparatus including a single discharge lamp ballast circuit.

In contrast with this, the discharge lamp ballast apparatus of the present embodiment 6 as shown in FIG. 9 includes two discharge lamp ballast circuits, each of which operates as a load of the DC power supply 1.

In FIG. 9, the discharge lamp ballast apparatus of the present embodiment 6 includes a DC power supply 11, a first discharge lamp ballast circuit 12, a second discharge lamp ballast circuit 13, a first load current detecting resistor 14 (R121), a second load current detecting resistor 15 (R131), a total current detector 16 and a controller 17. The first discharge lampballast circuit 12 is provided for ballasting a discharge lamp 18 serving as the right headlight of an automobile, and the second discharge lamp ballast circuit 13 is provided for ballasting a discharge lamp 19 serving as the left headlight of the automobile.

In the foregoing configuration, the DC power supply 11 corresponds to the DC power supply 1 of FIG. 1, which consists of a battery with a DC voltage Vb, for example.

The first discharge lamp ballast circuit 12 and the second discharge lamp ballast circuit 13 have the same configuration. They each has a DC power supply circuit that includes a boosting DC/DC converter transformer 121 (131) with its primary side being isolated from its secondary side, a MOS FET switching transistor 122 (132) for carrying out switching of the transformer 121 (131), and a rectifier diode 123 (133) and a smoothing capacitor 124 (134) for converting the AC voltage generated in the transformer 121 (131) to a DC voltage, and that converts the DC voltage Vb applied from the DC power supply 11 to the primary side of the transformer 121 (131) to a DC voltage Vo with a specified voltage and outputs it from the secondary side of the transformer 121 (131); an inverter circuit 125 (135) for converting the DC voltage Vo passing through the rectifier diode 123 (133) and smoothing capacitor 124 (134) to a rectangular wave AC; and an igniter 126 (136) for generating a high voltage starting pulse from the rectangular wave AC converted by the inverter circuit 125 (135) and for supplying it to the discharge lamp 18 (19) to start discharge. The first discharge lampballast circuit 12 and second discharge lamp ballast circuit 13 each have the same basic configuration as that of FIG. 1 except that they each employ the transformer 121 (131) with its primary side being isolated from the secondary side. The DC power supply circuit and the inverter circuit 125 (135) constitute the power supply circuit of the discharge lamp ballast apparatus in a broad sense.

The first load current detecting resistor 14 (R121) and second load current detecting resistor 15 (R131) constitute a load current detecting means for detecting the current flowing from the DC voltage Vb of the DC power supply 11 to the first discharge lamp ballast circuit 12 or second discharge lamp ballast circuit 13 as a voltage signal. These currents are a load current of the DC power supply 11, each.

A total current detector 16, which corresponds to the total current detector 7 of FIG. 1, detects the total current value flowing to the plurality of load circuits from the load currents detected by the first load current detecting resistor 14 (R121) and second load current detecting resistor 15 (R131).

A controller 17, which corresponds to the controller 8 of FIG. 1, carries out the switching control of the switching transistor 122 (132) of the first discharge lamp ballast circuit 12 and second discharge lamp ballast circuit 13 in response to the total current value detected by the total current detector 16 to control their output power, thereby controlling the current Ib fed from the DC power supply 11.

Next, the control operation of the current Ib fed from the DC power supply 11 will be described with reference to the concrete configuration of the total current detector 16 as shown in FIG. 9.

The concrete internal configuration of the total current detector 16 as shown in FIG. 9, which corresponds to the total current detector 7A described in the embodiment 1 (FIG. 3), includes resistors 161 (R161), 162 (R162), 163 (R163) and 164 (R164), and an amplifier 165 consisting of an operational amplifier, for example, and constitutes a summing amplifier circuit.

In this configuration, the resistor 161 (R161) is connected to the first load current detecting resistor 14 (R121), and the resistor 162 (R162) is connected to the second load current detecting resistor 15 (R131). Through the two resistors 161 (R161) and 162 (R162), the voltage signal of the load current of the first discharge lamp ballast circuit 12 detected by the first load current detecting resistor 14 (R121) is combined with the voltage signal of the load current of the second discharge lamp ballast circuit 13 detected by the second load current detecting resistor 15 (R131), and the combined voltage signal is supplied to the non-inverting input terminal (+terminal) of the amplifier 165. The inverting input terminal (−terminal) is connected to the resistors 163 (R163) and 164 (R164) as shown in FIG. 9 so that the amplifier 165 constitutes the non-inverting amplifier as in the total current detector 7A. Amplifying the input signals, the amplifier 165 detects and outputs the signal Sg corresponding to the total current value equal to the sum of the load current of the first discharge lamp ballast circuit 12 flowing through the first load current detecting resistor 14 (R121) and the load current of the second discharge lamp-ballast circuit 13 flowing through the second load current detecting resistor 15 (R131), thereby providing the signal Sg of the total current value corresponding to the current Ib fed from the DC power supply 11.

The signal Sg indicating the total current value, which is output from the amplifier 165, is supplied to the controller 17. The controller 17 carries out the switching control of the switching transistors 122 and 132 of the first discharge lamp ballast circuit 12 and second discharge lamp ballast circuit 13 in response to the signal Sg representing the total current value to control the output power, thereby controlling the current Ib fed from the DC power supply 11. In this case, the controller 17 controls the output power in such a manner that the DC output voltage Vo of each of the first discharge lamp ballast circuit 12 and second discharge lamp ballast circuit 13 is kept nearly constant when the signal Sg indicating the total current value is within the overcurrent limiting value of the preset DC power supply 1. In contrast, when the signal Sg indicating the total current value exceeds the overcurrent limiting value, the controller 17 limits the output power of the DC power supply circuit of each of the first discharge lamp ballast circuit 12 and second discharge lamp ballast circuit 13 to impose the overcurrent limitation on the current fed from the DC power supply 11.

Although the foregoing description is made assuming that the concrete internal configuration of the total current detector 16 corresponds to the total current detector 7A of the embodiment 1 (FIG. 3), this is not essential. For example, a configuration corresponding to the total current detector 7B of the embodiment 2 (FIG. 4) can also be employed.

Alternatively, the comparator 706 of the total current detector 7B can be provided with the amplifying function so that the summing amplifier and the overcurrent detecting comparator are integrated (not shown).

Furthermore, the capacitor 708 (C1) constituting the integrating circuit of the total current detector 7B can be provided with the integrating circuit voltage setting means described in the embodiment 5 (FIG. 7) (not shown).

Although the configuration of FIG. 9 includes two circuits with the same configuration, the first discharge lamp ballast circuit 12 and second discharge lamp ballast circuit 13, as the load of the DC power supply 11, this is not essential. For example, it can include three or more circuits as the load. In this case, the total current detector 16 detects the total current value by summing up the load currents from the three or more loads, and the controller 17 carries out the switching control of the individual switching transistors of the DC power supply circuits associated with the three or more loads in response to the detected total current value as described above.

As described above, the present embodiment 6 is configured in such a manner that the first load current detecting resistor 14 detects the current value which is split from the DC power supply 11 to the first discharge lamp ballast circuit 12 and the second load current detecting resistor 15 detects the current value which is split from the DC power supply 11 to the second discharge lamp ballast circuit 13; the total current detector 16 detects the total current value flowing through the load circuits such as the first discharge lamp ballast circuit 12 and second discharge lamp ballast circuit 13 in response to the detected current value; and the controller 17 controls the output power by controlling the individual switching transistors 122 and 132 of the first discharge lamp ballast circuit 12 and second discharge lamp ballast circuit 13 in response to the total current value detected, thereby controlling the current Ib fed from the DC power supply 11. As a result, in the discharge lamp ballast apparatus which is configured in such a manner that the load currents are divided from the single DC power supply 11 into the plurality of load circuits such as the first discharge lamp ballast circuit 12 and second discharge lamp ballast circuit 13, it is possible to detect the current value corresponding to the power supply current value flowing out of the single DC power supply 11 accurately, and to control the current Ib fed from the DC power supply 11 appropriately in response to the detected results.

In addition, the controller 17 is configured in such a manner that when the signal Sg indicating the total current value exceeds the preset overcurrent limiting value of the DC power supply 11, the controller 17 limits the output power of the individual DC power supply circuits of the first discharge lamp ballast circuit 12 and second discharge lamp ballast circuit 13 to impose the overcurrent limitation on the current fed from the DC power supply 11. As a result, the controller 17 can protect the DC power supply 11, or the load circuits such as the first discharge lamp ballast circuit 12 and second discharge lamp ballast circuit 13 from the overcurrent.

Furthermore, since the detecting circuit composed of the first load current detecting resistor 14 and the detecting circuit composed of the second load current detecting resistor 15 are independent of each other, the currents can be detected accurately without interference with each other.

Moreover, the total current detector 16 can have the same configuration as the total current detector 7A (embodiment 1) or the total current detector 7B (embodiment 2). The total current detector 16 with the same configuration, enjoying the advantages of the foregoing total current detector 7A or total current detector 7B, can accurately detect the current value corresponding to the power supply current value flowing from the DC power supply 11 into the plurality of load circuits such as the first discharge lamp ballast circuit 12 and second discharge lamp ballast circuit 13.

Besides, adding the integrating circuit voltage setting means of the embodiment 5 (FIG. 7) to the integrating circuit of the total current detector 7B enables the overcurrent limitation with the quick response characteristic.

INDUSTRIAL APPLICABILITY

As described above, the discharge lamp ballast apparatus in accordance with the present invention is suitable for detecting the power supply current supplied from the single DC power supply, and for controlling the current fed from the DC power supply in response to the detected results.

What is claimed is:

1. The discharge lamp ballast apparattis, comprising:
   a DC power supply circuit for supplying a voltage form a DC power supply to a primary side of a transformer of a DC/DC converter, and for converting the voltage to a prescribed DC voltage to be output from a secondary side of said transformer;
   an AC power supply circuit for converting the prescribed DC voltage from said DC power supply circuit to an AC voltage;
   a start circuit for generating a high voltage pulse and for superimposing the high voltage pulse on the AC voltage;
   first load current detecting means for detecting a load current flowing through the primary side of said transformer;
   second load current detecting means for detecting a load current value flowing through said AC power supply circuit;
   a total current detector for detecting a total current value of the load current value detected by said first load current detecting means and the load current value detected by said second load current detecting means; and
   a controller for controlling a current supplied from said DC power supply in response to the total current value detected by said total current detector.

2. The dischage lamp ballast apparatus according to claim 1, wherein said controller imposes overcurrent limitation on the current supplied from said DC power supply in response to the total current value detected by said total cut rent detector.

3. The discharge lamp ballast apparatus according to claim 1, wherein said total current detector comprises a summing amplifier circuit for carrying out summing amplification of the load current values detected by said plurality of load current detecting means.

4. The discharge lamp ballast apparatus according to claim 1, wherein said total current detector comprises a comparing circuit for comparing an output of said summing amplifier circuit with a reference value, and for limiting the current supplied from said DC power supply when the output of said summing amplifier circuit exceeds the reference value.

5. The discharge lamp ballast apparatus according to claim 4, wherein said comparing circuit has an integrating function irresponsible to an instantaneous large current.

6. The discharge lamp ballast apparatus according to claim 4. wherein said comparing circuit has an integrating function of setting an arbitrary response characteristic that is irresponsible to an instantaneous large current.

7. A discharge lamp ballast apparatus, comprising:
   a plurality of discharge lamp ballast circuits connected to a DC power supply each discharge lamp ballast circuit including a DC power supply circuit for supplying a voltage from a DC power supply to a primary side of a transformer of a DC/DC converter and for converting the voltage to a prescribed DC voltage to be output from a secondary side of said transformer, an AC power supply circuit for converting the prescribed DC voltaize horn said DC power supply circuit to an AC voltage, anti a start circuit br generating a high voltage pulse and for superimposing the high voltage pulse on the AC voltage;
   load current detecting means provided to the plurality of discharge lamp ballast circuits, respectively, for detecting individual load currents flowing though said plurality of discharge lamp ballast circuits;
   a total current detector for detecting a total cuuent value flowing into said plurality of discharge lamp ballast circuits in response to the load current values detected by said load current detecting means; and
   a controller for controlling a current supplied from said DC power supply in response to the total current value detected by said total current detector.

* * * * *